(12) United States Patent
Fukuda et al.

(10) Patent No.: US 11,687,579 B2
(45) Date of Patent: Jun. 27, 2023

(54) DICTIONARY EDITING SYSTEM INTEGRATED WITH TEXT MINING

(71) Applicant: International Business Machines Corporation, Armonk, NY (US)

(72) Inventors: Susumu Fukuda, Fujimino (JP); Kenta Watanabe, Soka (JP); Shunsuke Ishikawa, Tokyo (JP); Takashi Fukuda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 16/885,404

(22) Filed: May 28, 2020

(65) Prior Publication Data

US 2020/0293566 A1    Sep. 17, 2020

Related U.S. Application Data

(63) Continuation of application No. 16/038,224, filed on Jul. 18, 2018, now Pat. No. 10,740,381.

(51) Int. Cl.
*G06F 16/36* (2019.01)
*G06N 5/00* (2023.01)
(Continued)

(52) U.S. Cl.
CPC ............ *G06F 16/36* (2019.01); *G06F 16/313* (2019.01); *G06F 16/93* (2019.01); *G06F 40/169* (2020.01);
(Continued)

(58) Field of Classification Search
CPC .................................................. G06F 40/169
See application file for complete search history.

(56) References Cited

U.S. PATENT DOCUMENTS 6,470,306 B1 * 10/2002 Pringle ................. G06F 40/169
715/236
6,728,707 B1 *  4/2004 Wakefield ............. G06F 16/316
707/999.005
(Continued)

FOREIGN PATENT DOCUMENTS

CN       106776574       5/2017
JP      2020-516985      3/2022

OTHER PUBLICATIONS

UK Examination Report, dated Mar. 3, 2021.
(Continued)

*Primary Examiner* — Thuykhanh Le
(74) *Attorney, Agent, or Firm* — Lieberman & Brandsdorfer, LLC

(57) ABSTRACT

Embodiments are directed to a system, computer program product, and method for text mining, and dynamic facet and facet value management and application to a document collection. Two or more words from a first document collection are extracted, with the extracted words being associated with an applied annotation. At least one word is selected from the extracted words, designated as a facet, and a value is selectively added to the facet. An analysis of the added value is dynamically performed, and a dictionary with the annotation, facet, and values is constructed and the dictionary is applied to the document collection. A targeted list of documents is returned from the dictionary application to the document collection.

20 Claims, 7 Drawing Sheets

(51) Int. Cl.
*G06F 16/93* (2019.01)
*G06F 16/31* (2019.01)
*G06F 40/169* (2020.01)
*G06F 40/216* (2020.01)
*G06F 40/242* (2020.01)

(52) U.S. Cl.
CPC .......... *G06F 40/216* (2020.01); *G06F 40/242* (2020.01); *G06N 5/00* (2013.01); *G06F 2216/03* (2013.01)

(56) References Cited

U.S. PATENT DOCUMENTS

| | | | |
|---|---|---|---|
| 6,732,097 B1* | 5/2004 | Wakefield | G06F 16/316 707/999.005 |
| 6,732,098 B1* | 5/2004 | Wakefield | G06F 16/3344 707/999.005 |
| 6,738,765 B1* | 5/2004 | Wakefield | G06F 16/284 707/999.005 |
| 7,171,349 B1* | 1/2007 | Wakefield | G06F 16/316 707/E17.085 |
| 7,689,411 B2* | 3/2010 | Sandor | G06F 16/951 704/7 |
| 7,945,527 B2* | 5/2011 | Michelin | G06F 40/30 706/62 |
| 8,594,996 B2 | 11/2013 | Liang et al. | |
| 8,856,096 B2 | 10/2014 | Marchisio et al. | |
| 8,983,930 B2* | 3/2015 | Cheng | G06F 16/24578 707/723 |
| 9,348,920 B1* | 5/2016 | Kesin | G06F 16/93 |
| 9,710,458 B2* | 7/2017 | Ghannam | G06F 40/40 |
| 10,055,410 B1* | 8/2018 | Dubbels | G06F 40/237 |
| 10,255,271 B2 | 4/2019 | Alba et al. | |
| 10,303,771 B1* | 5/2019 | Jezewski | G06F 18/2413 |
| 10,437,931 B1 | 10/2019 | Matskevich et al. | |
| 2004/0006455 A1* | 1/2004 | Fux | G06F 40/216 704/4 |
| 2005/0197829 A1* | 9/2005 | Okumura | G06F 40/242 704/10 |
| 2006/0069673 A1 | 3/2006 | Morikawa et al. | |
| 2006/0190256 A1* | 8/2006 | Stephanick | G06V 10/987 704/E15.045 |
| 2006/0293880 A1* | 12/2006 | Elshishiny | G06F 40/242 704/10 |
| 2007/0005343 A1* | 1/2007 | Sandor | G06F 16/951 707/E17.108 |
| 2007/0005344 A1* | 1/2007 | Sandor | G06F 16/313 707/E17.084 |
| 2007/0033008 A1* | 2/2007 | Takuechi | G06F 40/216 704/10 |
| 2007/0106499 A1* | 5/2007 | Dahlgren | G06F 16/243 704/10 |
| 2007/0179776 A1* | 8/2007 | Segond | G06F 40/211 707/E17.062 |
| 2007/0239742 A1* | 10/2007 | Saha | G06F 16/36 |
| 2008/0091408 A1* | 4/2008 | Roulland | G06F 40/211 707/E17.074 |
| 2010/0228693 A1* | 9/2010 | Dawson | G06F 40/30 707/769 |
| 2011/0078167 A1 | 3/2011 | Sundaresan et al. | |
| 2011/0225155 A1* | 9/2011 | Roulland | G06F 16/3325 707/750 |
| 2012/0265724 A1* | 10/2012 | Michelin | G06N 5/02 706/55 |
| 2012/0330869 A1* | 12/2012 | Durham | G06N 5/022 706/16 |
| 2013/0282757 A1* | 10/2013 | Ehsani | G06F 16/168 707/769 |
| 2014/0046891 A1* | 2/2014 | Banas | G06N 5/022 706/46 |
| 2014/0258277 A1* | 9/2014 | Cheng | G06F 16/24578 707/723 |
| 2014/0303962 A1* | 10/2014 | Minca | G06F 40/242 704/9 |
| 2015/0100308 A1* | 4/2015 | Bedrax-Weiss | G06F 40/242 704/10 |
| 2015/0347570 A1 | 12/2015 | Desai et al. | |
| 2016/0179933 A1 | 6/2016 | Dimassimo et al. | |
| 2016/0266738 A1* | 9/2016 | Martello | G06F 8/34 |
| 2016/0292153 A1* | 10/2016 | Agarwalla | G06F 16/93 |
| 2016/0321365 A1* | 11/2016 | Duan | G06F 16/3346 |
| 2017/0148078 A1* | 5/2017 | Agarwal | G06F 16/9535 |
| 2017/0161373 A1* | 6/2017 | Goyal | G06F 16/3322 |
| 2017/0255603 A1 | 9/2017 | Kajinaga et al. | |
| 2018/0032522 A1* | 2/2018 | Singhal | G06F 16/24578 |
| 2018/0032523 A1* | 2/2018 | Singhal | G06F 16/90328 |
| 2018/0060936 A1* | 3/2018 | Gupta | G06Q 30/0627 |
| 2018/0096203 A1 | 4/2018 | King et al. | |
| 2018/0122015 A1 | 5/2018 | Drennan, III | |
| 2018/0357219 A1* | 12/2018 | Li | G06F 16/36 |
| 2019/0114370 A1 | 4/2019 | Cerino et al. | |
| 2019/0311009 A1* | 10/2019 | Goyal | G06F 16/334 |
| 2020/0026708 A1* | 1/2020 | Ahn | A63F 13/79 |
| 2020/0285808 A1* | 9/2020 | Yoshida | G06F 40/237 |
| 2020/0293566 A1* | 9/2020 | Fukuda | G06F 16/36 |
| 2021/0026930 A1* | 1/2021 | Muto | G06F 13/00 |

OTHER PUBLICATIONS

List of IBM Patents or Applications Treated as Related, Jul. 2020.
Rak, Rafal, et al., Argo: An Integrative, Interactive, Text Mining-Based Workbench Supporting Curation, Database: The Journal of Biological Databases and Curation. 2012;2012:bas010. doi:10.1093/database/bas010. Feb. 13, 2012.
Patent Cooperation Treaty, International Search Report, PCT/IB2019/056094, dated Nov. 5, 2019.
JP Notice of Patent Grant, dated Feb. 7, 2023.

* cited by examiner

DICTIONARY EDITING SYSTEM INTEGRATED WITH TEXT MINING

CROSS-REFERENCE TO RELATED APPLICATION(S)

This application is a continuation patent application of and claims the benefit of the filing date of U.S. patent application Ser. No. 16/038,224 filed Jul. 18, 2018, titled "Dictionary Editing System Integrated With Text Mining", now U.S. Pat. No. 10,740,381, which is hereby incorporated by reference.

BACKGROUND

The present embodiments relate to text mining a collection of documents. More specifically, the embodiments relate to integrating dictionary management with an associated text mining system.

Text mining is a technology utilized for understanding a large amount of non-structured text data without necessarily reading the entire content of associated documents. More specifically, text mining is a process of analyzing collections of textual materials in order to capture key concepts and themes and uncover hidden relationships and trends without requiring knowledge of precise words or terms used by associated authors to express those concepts. Text mining identifies concepts, patterns, topics, keywords, and other attributes in the data.

Text mining extracts linguistic facets, which are sets of words and phrases representing features of documents. Facets correspond to properties of information elements. Facets are significant aspects of documents; facets are derived from either metadata that is already structured or from concepts that are extracted from textual content. For example, facets may include people, places, organizations, sentiment analysis, etc. Facets are often derived by analysis of text of an item using entity extraction techniques or from pre-existing fields in a database, such as author, descriptor, language, and format. In a content analytics collection, facets are selected to explore analyzed content and discover patterns, trends, and deviations in data over time. Determining which facets are displayed and what contributes to each facet is a critical design task for successful content mining.

Conventional techniques for text mining utilize an external editor to manage facets and application of facets to a dictionary associated with the text mining. These techniques have limitations in that the process for adding a word found in the text mining process requires a rebuilding of an associated index to check if the added words function well with the text mining.

SUMMARY

The embodiments described herein include a system, a computer program product, and a method for facet dictionary management.

In one aspect, a computer system is provided with a processing unit in communication with memory, and tools to support text mining and facet dictionary construction. The tools include, but are not limited to, text, facet, and dictionary managers. The text manager extracts two or more words from a document collection, with the extracted words being associated with an applied annotation. The text manager further selects at least one word from the extracted words, designates the selected word as a facet, and selectively adds a value to the facet. The facet manager dynamically performs an analysis of the added value. The dictionary manager constructs a dictionary with the annotation, facet, and values, and applies the dictionary to the document collection. A targeted list of documents is returned from the dictionary application to the document collection.

In another aspect, a computer program product is provided to support text mining. The computer program product includes a computer readable storage medium with embodied program code that is configured to be executed by a processing unit. Program code is provided to extract two or more words from a document collection, with the extracted words being associated with an applied annotation. The program code selects at least one word from the extracted words, designates the selected word as a facet, and selectively adds a value to the facet. Program code is also provided to dynamically perform an analysis of the added value, construct a dictionary with the annotation, facet, and values, and apply the dictionary to the document collection. A targeted list of documents is returned from the dictionary application to the document collection.

In yet another aspect, a method is provided for text mining and dynamic facet and facet value management and application to a document collection. Two or more words from a document collection are extracted, with the extracted words being associated with an applied annotation. At least one word is selected from the extracted words, designated as a facet, and a value is selectively added to the facet. An analysis of the added value is dynamically performed, and a dictionary with the annotation, facet, and values is constructed and applied to the document collection. A targeted list of documents is returned from the dictionary application to the document collection.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments unless otherwise explicitly indicated.

DETAILED DESCRIPTION

Figure 1:
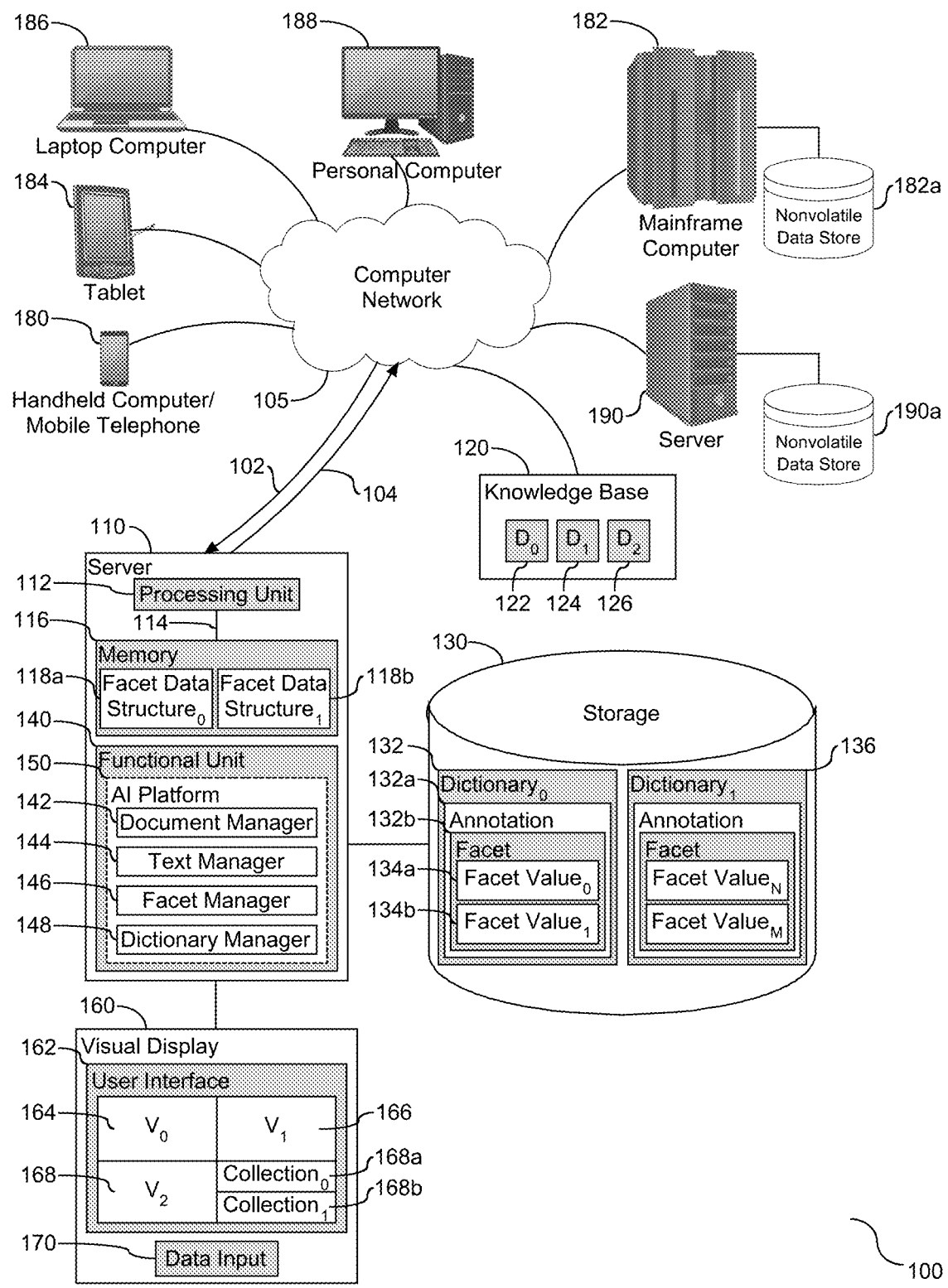
FIG. 1 depicts a block diagram illustrating a text mining system and tools to support dynamic facet management therein.

It will be readily understood that the components of the present embodiments, as generally described and illustrated in the Figures herein, may be arranged and designed in a wide variety of different configurations. Thus, the following detailed description of the embodiments of the apparatus, system, and method, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A text mining system has two types of applications, including a text mining application and a dictionary editor application. The text mining application supports a query of a subset of documents and returns document content and statistical analysis of data associated with each facet. The dictionary editor application supports facet management with respect to creation, editing, and deletion of its content. It is understood that defining the facets and their values are essential to effective analysis results in a text mining system. As shown and described below, text mining is integrated with dynamic facet editing. More specifically, a text mining tool and a dictionary management tool are integrated to support calculation of an approximate value for words present in the facet. The calculation returns analytics results, including but not limited to, statistics information, such as frequency and correlation. Frequency is directed at the number of documents that contain the specific facet value. Correlation is a measure of how strongly the facet value is related to the set of documents that are selected by the current query, compared to other documents in the collection. The analytics results are returned without a re-indexing of the dictionary.

Within a facet, individual values are referred to as facet value which may come from different sources. For example, in the field of databases, facet values come from field values in data are called facet values. It is understood that facet values are varied. For example, for a facet to identify color, the values may be specific colors, e.g. red, blue, etc. In one embodiment, the facet can be applied to natural language processing tool to extract the facet values. In another example, the facet may be a noun sequence facet implemented as a pattern of two or more consecutive nouns. It is understood that there is variation in facets and facet values, with the values being dependent on or associated with a corpus.

Each facet value is a structure that contains information about the value stored within the facet as well as potentially other facets. Referring to FIG. 1, a block diagram (100) is provided to illustrate a text mining system and tools to support dynamic facet management therein. As shown, a server (110) is provided in communication with a computer network (105) across connections (102) and (104). Several devices may also be in communication with the network (105), including but not limited to handheld computers, mobile phones (180), tablets (184), laptop computers (186), and personal computers (188). The system may also include larger scale devices, such as mainframe computers (182) with separate non-volatile data storage (182a) or servers (190) with separate non-volatile data storage (190a). With the server (110), a processing unit (112) is shown in communication with memory (116) across a bus (114). A functional unit (140) is shown in communication with the processing unit, and including tools to support text mining and facet management.

As shown, the server (110) is in communication with a knowledge base (120) of text based documents or documentation. The knowledge base (120) functions as a corpus, and in one embodiment, may be comprised of multiple corpi, including but not limited to a collection of written texts and may be a network of text based collections. Alternatively, the knowledge base (120) may function as a single corpus. The knowledge base (120) is shown operatively coupled to the server (110) across the network (105). In one embodiment, the knowledge base (120) may be stored on shared data storage, such as a cloud shared resource. Similarly, in one embodiment, the knowledge base (120) may be locally coupled to the server (110). In the example shown herein, the knowledge base (120) is comprised of shared resources operatively coupled to the server (110) across the network (105). More specifically, the knowledge base (120) is shown with data resources shown herein as $D_0$ (122), $D_1$ (124), and $D_2$ (126). In one embodiment, each data resource may be a collection of documents that are accessible by the server (110) or any computing device operatively coupled to the knowledge base (120).

With respect to text and text mining, an annotation is understood in the art to be a note of explanation or comment added to text. Annotations are known in the art to be associated with text. Examples of annotations include, but are not limited to, linguistic elements, such as parts of speech and/or patterns. The tools shown associated with the functional unit (140) integrate an annotation with a text mining system and text mining support. The tools include, but are not limited to, a document manager (142), a text manager (144), a facet manager (146), and a dictionary manager (148). The document manager (142) functions to integrate an annotation with text mining. More specifically, the document manager (142) applies the annotation to the knowledge base (120), and through support of the text manager (144), facet manager (146), and dictionary manager (148), a first document or a first collection of documents is returned from the knowledge base (120). Each returned first document or first collection is based on a relationship to the applied annotation. As shown herein, a visual display (160) is operatively coupled to the server (110). In one embodiment, the visual display (160) includes a user interface (162) to convey the returned first document or first collection. The visual display (160) is shown with three views, including $V_0$ (164), $V_1$ (166), and $V_2$ (168), although the quantity of views should not be considered limiting, and is merely for illustrative purposes. Each view is configured to convey different categories of data as related to the text mining system. As shown herein, the collection (168a) which is returned is shown in a separate view, e.g. window, of the visual display (162). The collection at (168a) is hereinafter referred to as a returned collection. Accordingly, the document manager (142) functions as an interface with the knowledge base (120).

As shown and described, the text manager (144) is operatively coupled to the document manager (142). The text manager (144) functions as an interface with the returned collection (168a). More specifically, the text manager (144) applies the annotation to the returned collection (168a), including the text manager (144) extracting two or more words from the returned collection (168a). The extracted words are linguistically associated with the annotation that was applied to the knowledge base (120). In one embodiment, the text manager (144) is or functions as a linguistic parser. The user interface (162) functions as an interactive platform for the text mining. In one embodiment, an implement including, but not limited to, a computer mouse, stylus, pointer, or in the case of a display with a capacitive sensor, a gesture may be utilized to interface with the user interface (162) and the views (164)-(168). More specifically, through the user interface, the text manager (144) supports or selects at least one word from the extracted two or more words from the returned collection (168a), and designates the selected word as a facet. It is understood in the art that each facet is comprised of facet values, as defined and described above. The text manager (144) selectively supports or adds a facet value to the designated facet. In one embodiment, the facet value that is added to the designated facet is selected from one or more linguistic terms that are identified from the returned collection of documents (168a) that is returned by the document manager (142), with the returned collection of documents (168) determined to be related to the designated facet. Accordingly, the text manager (144) functions with the document manager (142) to manage facet and facet value assignment and/or designation.

The facet manager (146) is shown operatively coupled to the text manager (144). The facet manager (146) functions to dynamically execute analysis of the selectively added facet value. More specifically, the analysis conducted by the facet manager (146) is statistically based, e.g. a statistical analysis, with the analysis including a calculation of an approximate value for the temporary addition of the facet value. Accordingly, the facet manager (146) functions as an analysis tool directed at the facet value(s).

A collection of one or more facet(s), together with their one or more facet values, forms a dictionary. As a facet is added to the collection or a selection of one or more facet values for any of the facets is modified, the composition of the dictionary changes. One or more of the dictionaries (132) are shown operatively coupled to the functional unit (140) and the memory (116). In one embodiment, the one or more dictionaries (132) are stored in memory. Similarly, in one embodiment, the one or more dictionaries may be stored in persistent storage (130) shown herein operatively coupled to the server (110). In one embodiment, the persistent storage (130) is remotely stored and operatively coupled to the server (110) across the network (105). As shown, the dictionary manager (148) is operatively coupled to the facet manager (146). The dictionary manager (148) constructs a first temporary dictionary (132), dictionary$_0$, that is comprised of the annotation (132a), the facet (132b), and temporarily added facet values (134a) and (134b). Although two facets values (134a) and (134b) are shown herein, the quantity is for illustrative purposes and should not be considered limiting. One or more of the collections (122)—(126) in the knowledge base (120) are identified or selected by the dictionary manager (148) based on the statistical analysis, followed by application of the dictionary (132) to the identified or selected collections. The statistical analysis includes, but is not limited to word count, frequency, and correlation for each facet value (134a) and (134b). This application returns a target list of documents (168a) shown presented in the user interface (162). Accordingly, the dictionary manager (148) interfaces with the facet manager (146) to selectively identify and return a targeted list of documents from one or more of the collections (122)—(126) and as related to the annotation, facet(s), and associated facet values.

It is understood that the data storage (130) may store more than one dictionary. Similarly, the dictionary may be designated as temporary or non-temporary. The designation of the dictionary category may be based on activity and modification of the dictionary. In one embodiment, the dictionary designation may be subject to change. Whether temporary or non-temporary, the dictionary is comprised of an on-memory facet data structure$_0$ (118a), shown herein operatively coupled to memory (116). The dictionary manager (148) indexes the selectively added facet value(s) (134a) and (134b) to the on-memory data structure (118a). In one embodiment, a separate data structure is created for each dictionary. Data structure (118a) is associated with dictionary$_0$ (132). The data structure (118a) and data structure (118b) (described below) are shown herein for illustrative purposes. The quantity should not be considered limiting. As the facet values (134a) and (134b) are indexed, the dictionary manager (148) updates the data structure (118a) to reflect the addition of the associated facet values to the returned target list of documents (168a). In one embodiment, the dictionary manager (148) indexes the facet values (134a) and (134b) in real-time.

The dictionary (132) is shown and described as a collection of facets and facet values. As the collection, or in one embodiment composition, of the dictionary changes, application of the dictionary to the corpus or selection of collections within the corpus, may return a different targeted list of document, collection$_0$, (168a). The returned collection (168a) may include some or none of the same documents returned in a prior application of a prior version of the dictionary to the knowledge base (120). As shown herein, the dictionary (132) is subject to modification, thereby creating a second dictionary (136), e.g. dictionary$_1$, having a different selection and collection of facet and facet values from dictionary$_0$ (132). In one embodiment, a second on-memory facet data structure$_1$ (118b) is created and associated with the second dictionary, dictionary$_1$, (136). Application of the second dictionary (136), and in one embodiment its associated data structure (118b), to the knowledge base (120) or selection of collections (122)-(126) in the corpus, returns a second target list of documents, collection$_1$, (168b). The creation of dictionaries is dynamic. As one dictionary is applied to the knowledge base (120), the text manager (144) generates a list of suggested data for adding to the applied dictionary. This list is based on content of the applied dictionary and the returned collection of targeted documents. The suggested data includes, but is not limited to, a new facet and/or one or more new facet values. Accordingly, the dictionary manager (148) interfaces with the text manager (144) for dynamic assessment of the returned collection of documents.

Suggested new facet(s) and new facet value(s) are shown and communicated on the visual display (160). In one embodiment, one of the views (164), (166), or (168) is employed as a field for illustrating and communicating the suggestion(s). Through use of the computer mouse (not shown), stylus (not shown), or another external implement that interfaces with the visual display (160), one or more of the suggestions may be selected. Based on the selection, the dictionary manager (148) adds the selection to the associated dictionary. In one embodiment, the added selection may be temporary, e.g. the dictionary may be designated temporary pending analysis of application of the new composition of the dictionary to the corpus. For example, in one embodiment, application of the new composition of the dictionary to the corpus may return a list of documents that are irrelevant or not directed to the intended result, and as such, the added selection may be removed from the dictionary. Similarly, in one embodiment, the returned list may be relevant, in which case the dictionary manager (148) may either create a new dictionary or designate the temporary selection as permanent. More specifically, the returned list being identified as relevant is followed by the dictionary manager (148) indexing the selectively added facet(s) and/or facet value(s) to the associated on-memory data structure and updating the associated data structure. The new dictionary or permanent dictionary is comprised of the indexed on-memory data structure, referred to herein as a facet data structure.

The tools (142)—(148) may comprise elements of an artificial intelligence (AI) platform (150) operatively coupled to the processing unit (112) and memory (116). The AI platform (150) provides support for integrating annotation(s) with text mining, including identification of facet(s) and facet value(s) in an electronic text based document and application thereof to the knowledge base (120) or a collection (122)—(126) within the knowledge base (120). As shown, the AI platform (150) includes tools which may be, but are not limited to, the document manager (142), text manager (144), facet manager (146), and dictionary manager (148). Each of these tools functions separately or combined in the AI platform (150) to dynamically evaluate one or more expressions within the knowledge base (120). The tools (142)—(148) that comprise the AI platform (150) employ aspects of the knowledge base (120) and/or the dictionary (132). The server (110) is programmed to obtain input data from the user interface (162), such as electronic text data. The AI platform (150) functions as an interface between received input data and the knowledge base (160). Analysis conducted by the AI platform (150) may generate a dictionary which, based on application to the knowledge base (120), generates a target list of documents (168a) or (168b), which may be conveyed as response data across the network (105). Accordingly, the AI platform (150) is programmed to identify relevant output data in the form of facet(s) and/or facet value(s), which upon application to the knowledge base (120) identifies the targeted list (168a) or (168b).

It is understood that the elements of the functional unit (140) or AI platform (150) may function in two or more operational states, including active and inactive. As a tool is employed and interfaces with the visual display (160) to actively convey data, the tools of the functional unit (140) or the AI platform (150) are activated. In one embodiment, the functional unit (140) or the AI platform (150) remains in the background in a low operating state until such time as the implement (not show) or gesture activates or changes the state of the functional unit (140) or AI platform (150) to an active state.

It is understood that the tools (142)—(148) may function as a facet application to create and/or modify one or more of the dictionaries (132) and (136) and generate the targeted list (168a) or (168b). The facet application functions in conjunction with the tools (142)—(148) to identify relevant and appropriate facet(s) and facet value(s) to create the targeted lists (168a) or (168b). As shown herein, when the application enters the active state, the application applies an annotation to the knowledge base (120) to search and identify any facets and facet values therein directed at or related to the annotation. Based on the facet and/or facet value identification, the knowledge base (120) is applied and consulted for the facet and/or facet value to facilitate ascertaining the targeted list of documents. It is understood that the facet and/or facet value is either present or absent from the knowledge base (120). If use of the facet and/or facet value is identified in the knowledge base (120), e.g. an entry for the facet and/or facet value is found, use of the facet and/or facet value within the document is conveyed on the visual display (160), or more specifically within a select or designated area of the visual display (160). Similarly, if the use of the facet and/or facet value is not found in the knowledge base (120), the functional unit (140) or AI platform (150) may selectively remove the associated facet(s) and/or facet value(s) from the dictionaries (132) and (136).

It is understood that the visual display (160) may be configured with a plurality of windows, with each of the windows configured to communicate different aspects of the dictionary and returned list of documents. For example, facets and facet values of a current dictionary may be presented on a first window, $V_0$, and suggested facets or facet values for the current dictionary may be presented on a second window, $V_1$. In one embodiment, the first window, $V_0$, is positioned proximal to the second window, $V_1$, so that the windows are not-overlapping to avoid interference. Accordingly, the user interface (162) is configured with multiple windows to interface with the functional unit (140) or AI platform (150) to selectively control presentation and selection of facets and facet values for the dictionary, as well as convey use of the facets and facet values within identified documents or electronic text within the knowledge base (120).

Application or submission of the annotation to the knowledge base (120) identifies one or more documents or relevant electronic document data. The document may be any digital data containing text. For example, the document may be a file such as XML, PDF, HTML, LaTeX, or any other file created by word processing software, a spreadsheet created by spreadsheet software, a presentation file created by presentation software. The meaning of document is not intended to be limited to a single file or any particular amount or unit of text, and in some cases a document may refer to a set of documents. In the example shown in the system (100) of FIG. 1, the user interface (162) may include a data input section (170) that when submitted to the knowledge base (120) obtains or identifies relevant documents or electronic data from an external document storage (122)-(126). The document(s) may be stored and/or created within the system (100) and/or can be obtained from or found on other computer(s) or server(s) through a network, such as, but not limited to, the Internet, WAN, and/or LAN.

Figure 2:
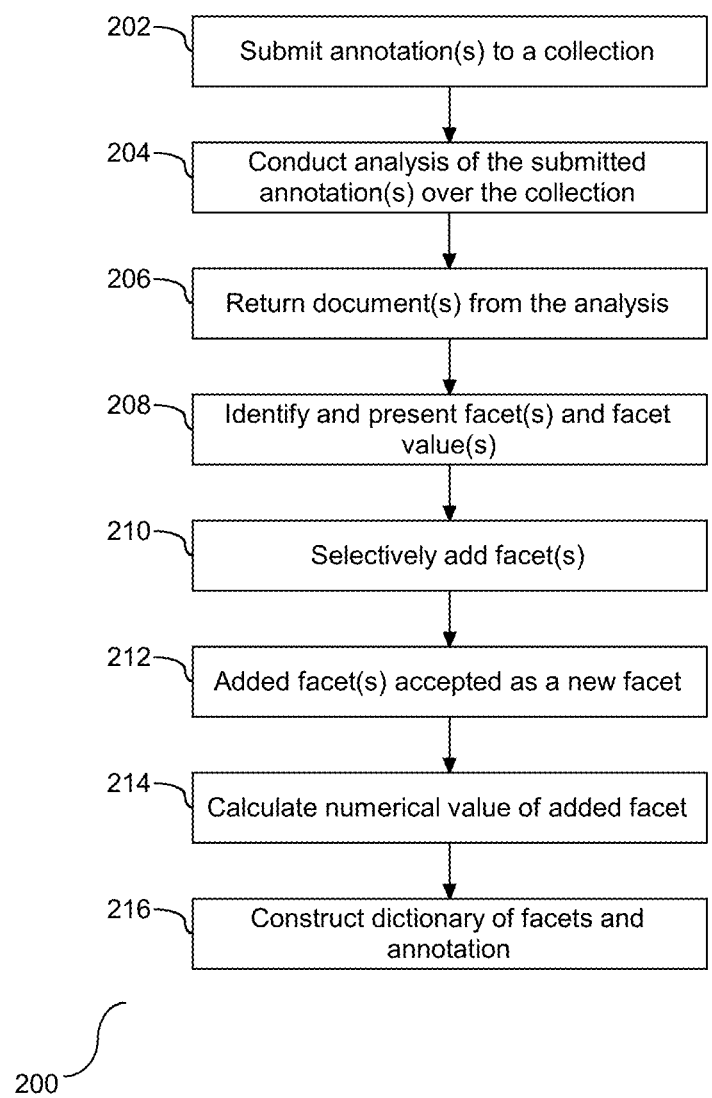
FIG. 2 depicts a flow chart illustrating a process for text mining integrated with facet editing.

Referring to FIG. 2, a flow chart (200) is provided illustrating a process for text mining integrated with facet editing. Text mining is a technology for understanding a large amount of non-structured text data without necessarily reading the entire content of documents in a collection. In the example shown in FIG. 2, the system (100) performs the operational flow shown and described. It is understood that the system (100) is not limited to using the described and illustrated operational flow. In one embodiment, the operational flow in FIG. 2 may be performed by a modified system or a system with different apparatus and components from the system (100) shown in FIG. 1.

As shown, the system (100) leverages a set of documents within the knowledge base (120) or within one or more collections (122)—(126) within the knowledge base (120), hereinafter referred to as a corpus. For example, the data input section (166) of the user interface (162) may identify one or more of the collections (122)—(126). A linguistic analysis is conducted on the identified collection(s), (204).

In one embodiment, one or more annotations are submitted to the identified collection(s) (202) and the analysis at step (204) of the annotation(s) is conducted over the identified collection(s). Examples of the annotations include, but are not limited to parts of speech and/or a pattern. One or more documents or electronic text are returned from the analysis (206). The analysis at step (204) includes text mining with respect to the annotation(s). It is understood that the text mining extracts or otherwise identifies one or more words from the returned documents or electronic text at step (206), with each extracted or identified word having an association with at least one of the submitted annotations. For each returned word, one or more suggested facets are identified and presented together with each facet having one or more associated facet values (208). Each facet is comprised of one or more facet values, also referred to herein as facet metadata. In addition, each facet value has a corresponding numerical value that correlates the relationship of the facet value to the returned documents. Examples of the numerical value include, but are not limited to, frequency and correlation.

The suggested facets and facet values emanate from the corpus and may be categorized based on the submitted annotation(s). In one embodiment, the suggested facet(s) are directed at metadata extracted from the document. In one embodiment, a word2vec routine may be utilized to identify one or more of the suggested facets, although this routine should not be considered limiting. As an example, the annotation is a travel related amenity, and a generated list of potential facet values may include specific amenity items. The list of facet(s) and facet values may be different for each annotation, or in one embodiment, there may be an overlap of one or more facets or facet values for different annotations identified in the text mining process. Accordingly, as documents are returned from the text mining, potential facets and facet values are identified.

Facets may be selectively added or removed from their association with the text mining. As one or more facets are added (210), the selected facet(s) are accepted as a new facet or a synonym of an existing facet or annotation (212). In one embodiment, the selection of facets at step (212) causes an update of the list of facets or annotations from the text mining and presentation thereof. As shown and described, the list of facets is not static. As facets are selected and associated with the text mining, potential facets are also subject to modification. In one embodiment, a refresh of the selection of facets may be initiated to identify a new or additional selection of facets. To calculate accurate statistical data for each facet, every facet is indexed into an associated text mining index. Following the selection and addition of one or more of the facets at step (212), an approximate numerical value for the added facet is calculated (214). In one embodiment, the calculation at step (214) returns a frequency value and a correlation for each facet as if the facet was an indexed facet in an associated dictionary. The frequency value is directed at a count of documents in the collection with the subject facet value, and the correlation is a ratio of an expected number of documents in the corpus with the facet value. The correlation helps identify significant facet values.

A dictionary is constructed from the selected facets and/or the annotations (216). In one embodiment, as one or more facets are selectively added, the composition of the dictionary changes, which in one embodiment, effectively creates a new format of the dictionary, e.g. a second dictionary. The created dictionary is effectively a collection of linguistic elements. The dictionary is subject to editing, which includes adding and removing elements from the dictionary. In one embodiment, the collection that comprises the dictionary is a selection and arrangement of directly or indirectly related linguistic elements. The dictionary is configured to be applied to the corpus for text mining. Accordingly, text mining and facet annotation is integrated together with statistical analysis and creation of a new dictionary.

Figure 3:
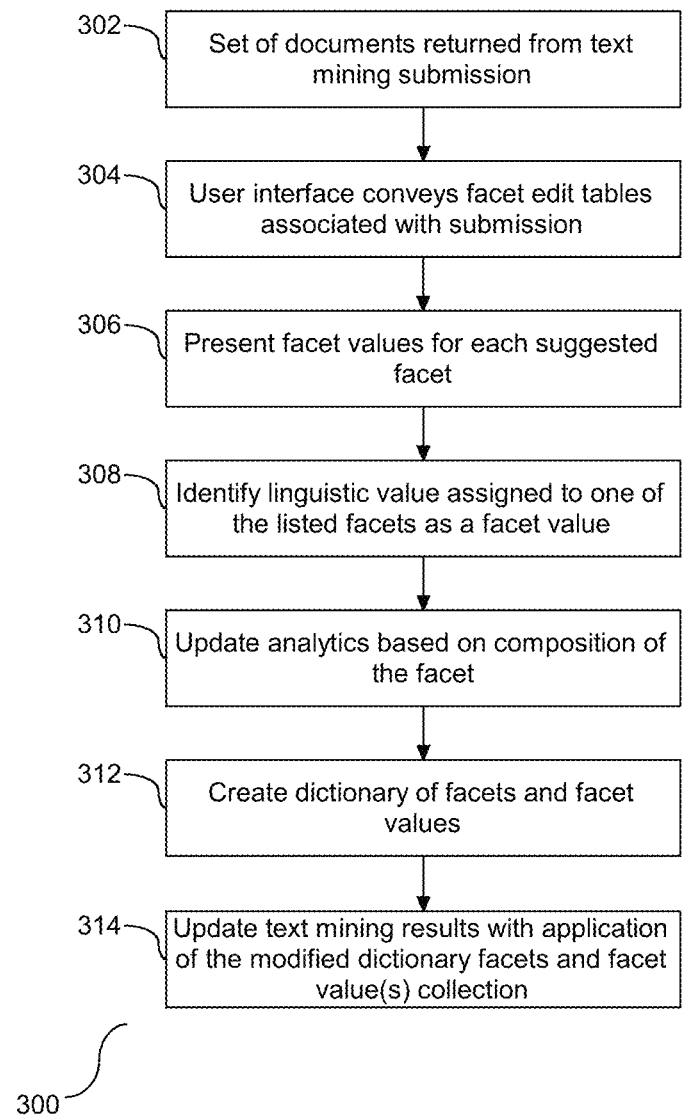
FIG. 3 depicts a flow chart illustrating a process for facet editing with facet value suggestions.

Referring to FIG. 3, a flow chart (300) is provided illustrating a process for facet editing with facet value suggestions. As shown, a set of documents is returned from a text mining submission (302). A user interface (UI) is provided in association the text mining. More specifically, the UI includes a facet edit table with a list of suggestions (304), with the suggestions including words collected from displayed facets, selected facets, optional or suggested facet values, and word history. For each suggested facet in the facet edit table, a list of facets where the word, e.g. facet values, may be assigned is presented (306). As a user finds or otherwise identifies an interesting word or linguistic value in the facet edit table, the identified word or linguistic value is assigned to one of the listed facets as a facet value (308). More specifically, at step (308) a facet which the identified facet value will be added to is typed, selected, or otherwise identified. In one embodiment, the AI platform (150) may conduct the identification and assignment of the facet(s) and facet value(s) at step (308). Following step (308), associated facet analytics are updated based on the modified composition of the facet (310). The analytics include a calculation of an approximate value for the modified facet composition reflecting the changed or new facet value(s). In one embodiment, the calculation at step (310) returns a frequency value and a correlation for each facet, and in one embodiment each facet value, as if the facet was an indexed facet in an associated dictionary. The collection of facets and their associated linguistic terms, e.g. facet values, effectively creates a dictionary of facets and facet values (312). Accordingly, as the collection and composition of facets are modified, the composition of the associated dictionary changes.

It is understood that the facet identification and facet value selection processes shown and described in FIGS. 2 and 3 modify an existing dictionary or create a new dictionary. The dictionary is configured to be applied to the knowledge base (120) or one or more collections (122)—(126) within the knowledge base (120), also referred to herein as a library. Application of the dictionary to the knowledge base (120) returns a set of one or more applicable electronic texts or documents. It is understood that as the composition of the dictionary changes, the selection of returned items in the text mining may change. Accordingly, following step (312), the text mining search results are updated to identify documents in the collection associated with the facets and facet values that comprise the associated dictionary (314).

Figure 4:
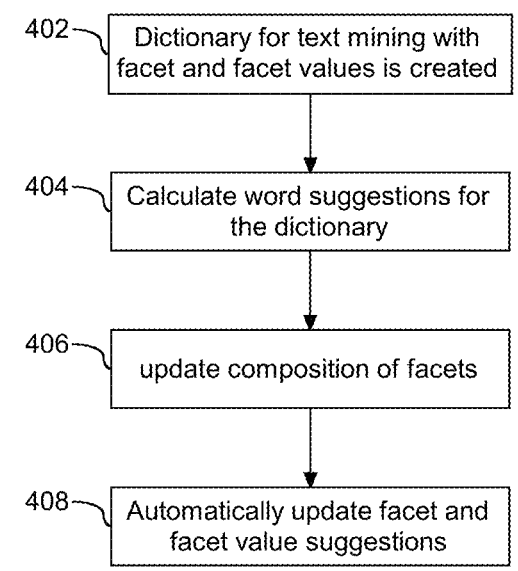
FIG. 4 depicts a flow chart illustrating a process for suggesting new facets, e.g. word suggestions, for the dictionary.

The goal of the facet and facet value identification and editing is to integrate dictionary management with text mining. Facets are comprised of facet values, e.g. facet metadata. As the selection and composition of facets change, the composition of the dictionary to which the facets belong is modified. In addition, as the dictionary is applied to the corpus and documents are identified new facets and/or new facet values may be suggested to direct the text mining. Referring to FIG. 4, a flow chart (400) is provided illustrating a process for suggesting new facets, e.g. word suggestions, for the dictionary. The word suggestions are based on seed words, which may come from a facet value, facet name, inputted or selected words in a text mining tool and its history, and combinations thereof. As shown in FIGS. 2 and 3, facets and associated facet values are created by identifying words, metadata for the identified words, and adding the words and metadata to an associated dictionary. More specifically, FIGS. 2 and 3 are directed at building the dictionary by adding entries. It is understood that the composition of the dictionary may change by removing entries as well. Every time an entry is added or removed from the dictionary, the composition of the dictionary is modified effectively creating a new dictionary. Words that are added to the dictionary are referred to as positive words, and words that are removed from the dictionary or otherwise rejected from entry into the dictionary are referred to as negative words.

The dictionary (132) is created with list of facets, with each facet having one or more facet values (402). As shown and described, the dictionary is dynamic and subject to modification. Word suggestions for the dictionary are calculated (404). In one embodiment, the word suggestions are based on seed words, which can come from facet values, facet words, and terms employed in the text mining process. Word suggestions may also be determined at least in part on one or more negative words. As the composition of the facets is updated (406), e.g. words are added, removed, or rejected, suggestions for the facets are automatically updated (408). Different techniques and algorithms may be employed to calculate word suggestions. For example, in one embodiment, word2vec may be utilized to find similar words, e.g. seed words, or highly correlated words in a document set. Such techniques return values from the seed words, and these values may then be used as a characteristic for selection into the dictionary.

As shown and described in FIGS. 2 and 3, statistics are calculated on facets and facet values. This calculation takes place without re-indexing the dictionary. Re-indexing is understood in the art to be directed at steps utilized to make a collection on the knowledge base analyzable using the dictionary. It includes the following: going through each document in the knowledge base, and for each word in the dictionary, extracting information about whether the document contains the word, e.g. annotation, and then building an inverted reference from the word to documents determined to contain the word. In addition, counts and correlations are calculated based on the inverted reference. As described herein, the calculation on the facets and facet values takes place without re-indexing the dictionary. In one embodiment, the calculation is in the form of real-time indexing which updates an on-memory facet counting data structure. The re-indexing reflects statistical value(s) of the new facet and associated facet values in real-time. In another embodiment, the calculation is a runtime dynamic assessment. For example, in one embodiment, an associated search engine is configured with an inverted index in the form of a keyword to document data structure, and the calculation of statistical values employs this data structure. Once the dictionary is finalized, the document manager (142) may be configured to apply annotations extracted from the dictionary to the knowledge base (120).

Aspects of text mining and dictionary management system and processes shown in FIGS. 1-4, employ one or more functional tools, as shown and described in FIG. 1. Aspects of the functional tools, e.g. document manager, text manager, facet manager, and dictionary manager, and their associated functionality may be embodied in a computer system/server in a single location, or in one embodiment, may be configured in a cloud based system sharing computing resources. With references to FIG. 5, a block diagram (500) is provided illustrating an example of a computer system/server (502), hereinafter referred to as a host (502) in communication with a cloud based support system, to implement the processes described above with respect to FIGS. 1-4. Host (502) is operational with numerous other general purpose or special purpose computing system environments or configurations. Examples of well-known computing systems, environments, and/or configurations that may be suitable for use with host (502) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (502) may be described in the general context of computer system-executable instructions, such as program modules, being executed by a computer system. Generally, program modules may include routines, programs, objects, components, logic, data structures, and so on that perform particular tasks or implement particular abstract data types. Host (502) may be practiced in distributed cloud computing environments where tasks are performed by remote processing devices that are linked through a communications network. In a distributed cloud computing environment, program modules may be located in both local and remote computer system storage media including memory storage devices.

Figure 5:
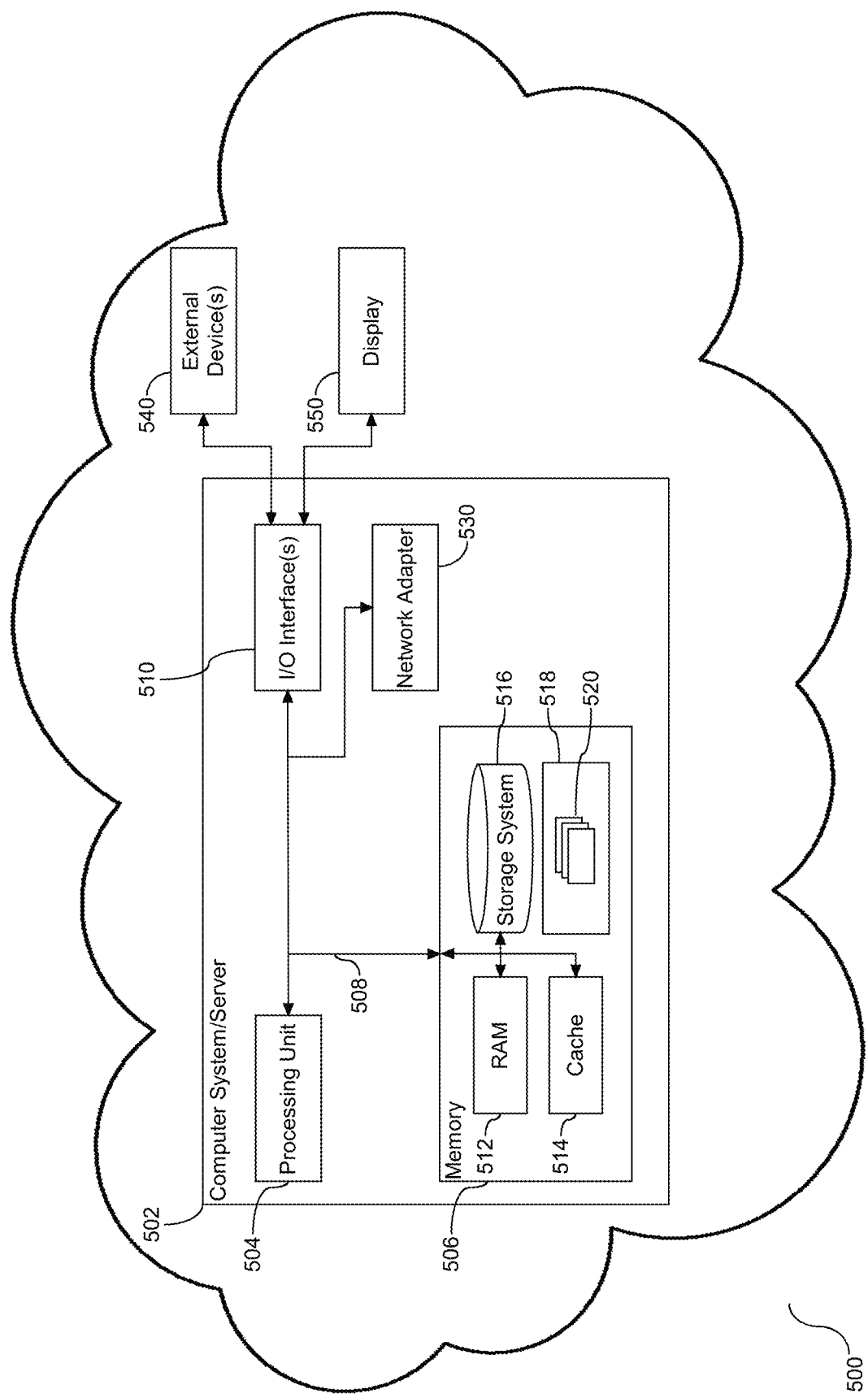
FIG. 5 depicts a block diagram illustrating an example of a computer system/server of a cloud based support system, to implement the system and process described above with respect to FIGS. 1-4.

As shown in FIG. 5, host (502) is shown in the form of a general-purpose computing device. The components of host (502) may include, but are not limited to, one or more processors or processing units (504), e.g. hardware processors, a system memory (506), and a bus (508) that couples various system components including system memory (506) to processor (504). Bus (508) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (502) typically includes a variety of computer system readable media. Such media may be any available media that is accessible by host (502) and it includes both volatile and non-volatile media, removable and non-removable media.

Memory (506) can include computer system readable media in the form of volatile memory, such as random access memory (RAM) (512) and/or cache memory (514). By way of example only, storage system (516) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (508) by one or more data media interfaces.

Program/utility (518), having a set (at least one) of program modules (520), may be stored in memory (506) by way of example, and not limitation, as well as an operating system, one or more application programs, other program modules, and program data. Each of the operating systems, one or more application programs, other program modules, and program data or some combination thereof, may include an implementation of a networking environment. Program modules (520) generally carry out the functions and/or methodologies of embodiments to dynamically apply and modify dictionaries comprised of facets and facet values. For example, the set of program modules (520) may include the modules configured as the document, text, facet, and dictionary managers as described in FIGS. 1-4.

Host (502) may also communicate with one or more external devices (540), such as a keyboard, a pointing device, etc.; a display (550); one or more devices that enable a user to interact with host (502); and/or any devices (e.g., network card, modem, etc.) that enable host (502) to communicate with one or more other computing devices. Such communication can occur via Input/Output (I/O) interface(s) (510). Still yet, host (502) can communicate with one or more networks such as a local area network (LAN), a general wide area network (WAN), and/or a public network (e.g., the Internet) via network adapter (530). As depicted, network adapter (530) communicates with the other components of host (502) via bus (508). In one embodiment, a plurality of nodes of a distributed file system (not shown) is in communication with the host (502) via the I/O interface (510) or via the network adapter (530). It should be understood that although not shown, other hardware and/or software components could be used in conjunction with host (502). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (506), including RAM (512), cache (514), and storage system (516), such as a removable storage drive and a hard disk installed in a hard disk drive.

Computer programs (also called computer control logic) are stored in memory (506). Computer programs may also be received via a communication interface, such as network adapter (530). Such computer programs, when run, enable the computer system to perform the features of the present embodiments as discussed herein. In particular, the computer programs, when run, enable the processing unit (504) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (502) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
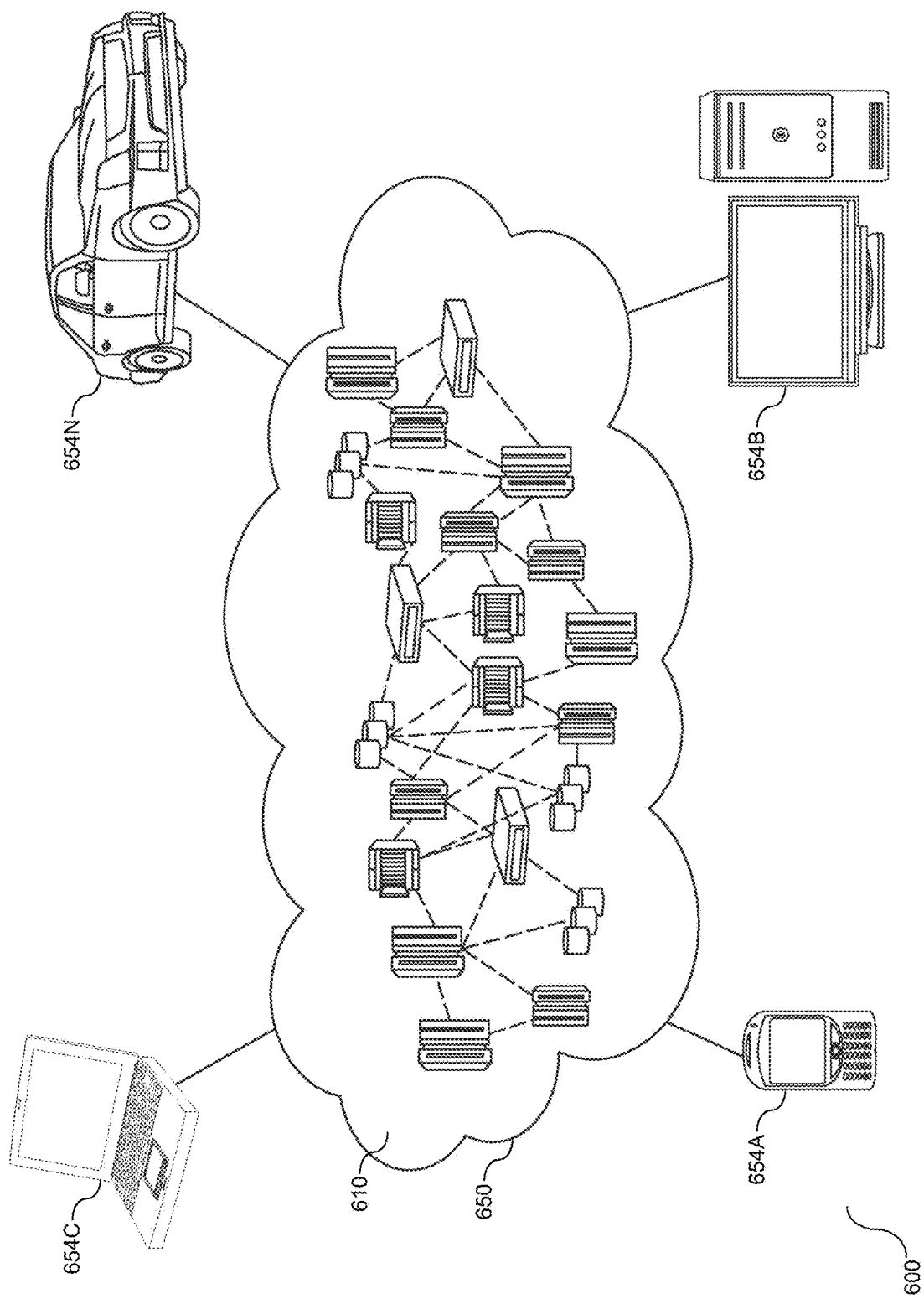
FIG. 6 depicts a block diagram illustrating a cloud computer environment.

Referring now to FIG. 6, an illustrative cloud computing network (600). As shown, cloud computing network (600) includes a cloud computing environment (650) having one or more cloud computing nodes (610) with which local computing devices used by cloud consumers may communicate. Examples of these local computing devices include, but are not limited to, personal digital assistant (PDA) or cellular telephone (654A), desktop computer (654B), laptop computer (654C), and/or automobile computer system (654N). Individual nodes within nodes (610) may further communicate with one another. They may be grouped (not shown) physically or virtually, in one or more networks, such as Private, Community, Public, or Hybrid clouds as described hereinabove, or a combination thereof. This allows cloud computing environment (600) to offer infrastructure, platforms and/or software as services for which a cloud consumer does not need to maintain resources on a local computing device. It is understood that the types of computing devices (654A-N) shown in FIG. 6 are intended to be illustrative only and that the cloud computing environment (650) can communicate with any type of computerized device over any type of network and/or network addressable connection (e.g., using a web browser).

Figure 7:
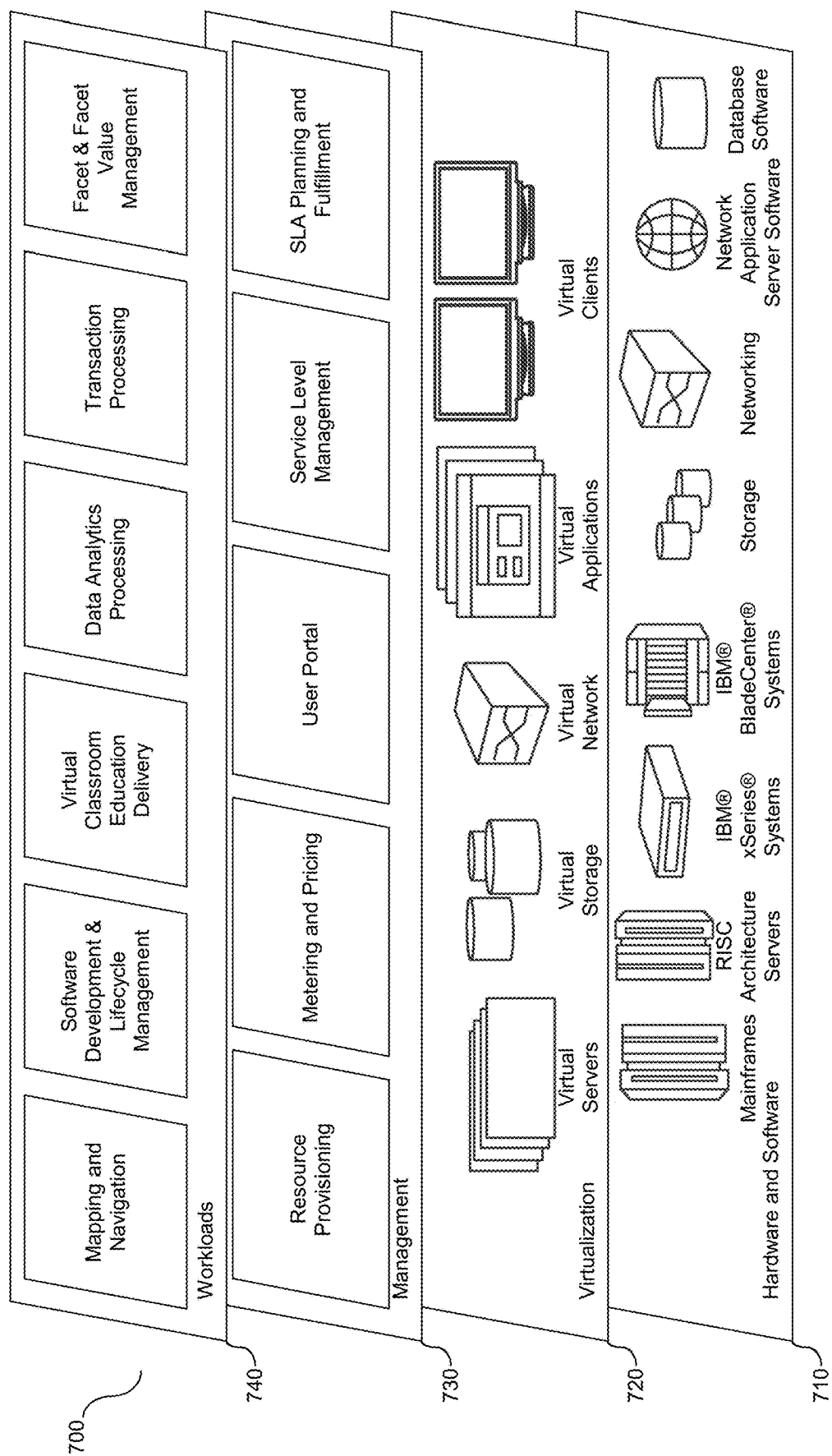
FIG. 7 depicts a block diagram illustrating a set of functional abstraction model layers provided by the cloud computing environment.

Referring now to FIG. 7, a set of functional abstraction layers (700) provided by the cloud computing network of FIG. 6 is shown. It should be understood in advance that the components, layers, and functions shown in FIG. 7 are intended to be illustrative only, and the embodiments are not limited thereto. As depicted, the following layers and corresponding functions are provided: hardware and software layer (710), virtualization layer (720), management layer (730), and workload layer (740). The hardware and software layer (710) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (720) provides an abstraction layer from which the following examples of virtual entities may be provided: virtual servers; virtual storage; virtual networks, including virtual private networks; virtual applications and operating systems; and virtual clients.

In one example, management layer (730) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (740) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and facet and facet value management.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Accordingly, the implementation of facet and facet value identification and management provides document efficient translations and analysis of idioms.

It will be appreciated that, although specific embodiments have been described herein for purposes of illustration, various modifications may be made without departing from the spirit and scope of the embodiments. In particular, the tools of the system shown and described may be utilized in conjunction with machine learning technology and applied to a corpus external to the knowledge base to return an accurate targeted list of documents. Accordingly, the scope of protection is limited only by the following claims and their equivalents.

What is claimed is:

1. A system comprising:
   a processing unit operatively coupled to memory; and
   a text manager operatively coupled to the processing unit, the text manager configured to:
     mine, including to extract two or more words from a first collection of documents, the extracted two or more words associated with an applied annotation;
     select at least one word from the extracted two or more words;
     designate the selected word as a facet; and
     selectively add a value to the facet, the value selected from one or more linguistic terms from the first collection of documents;
   a facet manager operatively coupled to the text manager, the facet manager configured to automatically dynamically analyze the selectively added value; and
   a dictionary manager operatively coupled to the facet manager, the dictionary manager configured to:
     construct a first dictionary comprising the annotation, the facet, and one or more of the analyzed selectively added values;
     selectively apply the constructed first dictionary to the first collection; and
     return a targeted list of documents from the selective application of the first dictionary to the first collection.

2. The system of claim 1, wherein the dictionary manager is further configured to construct a second dictionary, index the selectively added value to an on-memory data structure, and update the data structure to reflect the selectively added value responsive to the returned targeted list of documents.

3. The system of claim 2, wherein the second dictionary contains two or more facets, with each facet having one or more values.

4. The system of claim 3, wherein:
the text manager is further configured to calculate one or more word suggestions based on seed words; and
the dictionary manager is further configured to selectively add the one or more word suggestions to the second dictionary.

5. The system of claim 4, wherein the text manager is further configured to automatically update the calculated one or more word suggestions responsive to the selectively added one or more word suggestions to the second dictionary.

6. The system of claim 4, wherein the seed words comprise facet values, facet words, terms employed in a text mining process, or a combination thereof.

7. The system of claim 1, wherein the text manager, the facet manager, and the dictionary manager integrate the mining with dynamic management of the dictionary, including real-time re-indexing of the dictionary in response to an automatic update of a composition of facets.

8. The system of claim 1, further comprising the dictionary manager configured to construct the first dictionary with results of the analyzed selectively added value.

9. A computer program product for text mining, the computer program product comprising:
a computer readable storage device having program code embodied therewith, the program code executable by a processor to:
mine, including to extract two or more words from a first collection of documents, the extracted two or more words associated with an applied annotation;
select at least one word from the extracted two or more words;
designate the selected word as a facet;
selectively add a value to the facet, the value selected from one or more linguistic terms from the first collection of documents;
automatically dynamically analyze the selectively added value;
construct a first dictionary comprising the annotation, the facet, and one or more of the analyzed selectively added value; and
selectively apply the constructed first dictionary to the first collection; and
return a targeted list of documents from the selective application of the first dictionary to the first collection.

10. The computer program product of claim 9, further comprising program code executable by the processor to construct a second dictionary, index the selectively added value to an on-memory data structure, and update the data structure to reflect the selectively added value responsive to the returned targeted list of documents.

11. The computer program product of claim 10, wherein the second dictionary contains two or more facets, with each facet having one or more values.

12. The computer program product of claim 11, further comprising the program code executable by the processor to calculate one or more word suggestions based on seed words and selectively add the one or more word suggestions to the second dictionary.

13. The computer program product of claim 12, further comprising the program code executable by the processor to automatically update the calculated one or more word suggestions responsive to the selectively added one or more word suggestions to the second dictionary.

14. The computer program product of claim 9, wherein the program code is executable by the processor to integrate the mining with dynamic management of the dictionary, including real-time re-indexing of the dictionary in response to an automatic update of a composition of facets.

15. A method comprising:
mining, including extracting two or more words from a first collection of documents, the extracted two or more words associated with an applied annotation;
selecting at least one word from the extracted two or more words;
designating the selected word as a facet;
selectively adding a value to the facet, the value selected from one or more linguistic terms from the first collection of documents;
automatically dynamically analyzing the selectively added value;
constructing a first dictionary comprising the annotation, the facet, and one or more of the analyzed selectively added values;
selectively applying the constructed first dictionary to the first collection; and
returning a targeted list of documents from the selective application of the first dictionary to the first collection.

16. The method of claim 15, further comprising constructing a second dictionary, indexing the selectively added value to an on-memory data structure, and updating the data structure to reflect the selectively added value responsive to the returned targeted list of documents.

17. The method of claim 16, wherein the second dictionary contains two or more facets, with each facet having one or more values.

18. The method of claim 17, further comprising calculating one or more word suggestions based on seed words and selectively adding the one or more word suggestions to the second dictionary.

19. The method of claim 18, further comprising automatically updating the calculated one or more word suggestions responsive to the selectively added one or more word suggestions to the second dictionary.

20. The method of claim 15, further comprising integrating the mining with dynamic management of the dictionary, including real-time re-indexing of the dictionary in response to an automatic update of a composition of facets.

* * * * *